UNITED STATES PATENT OFFICE.

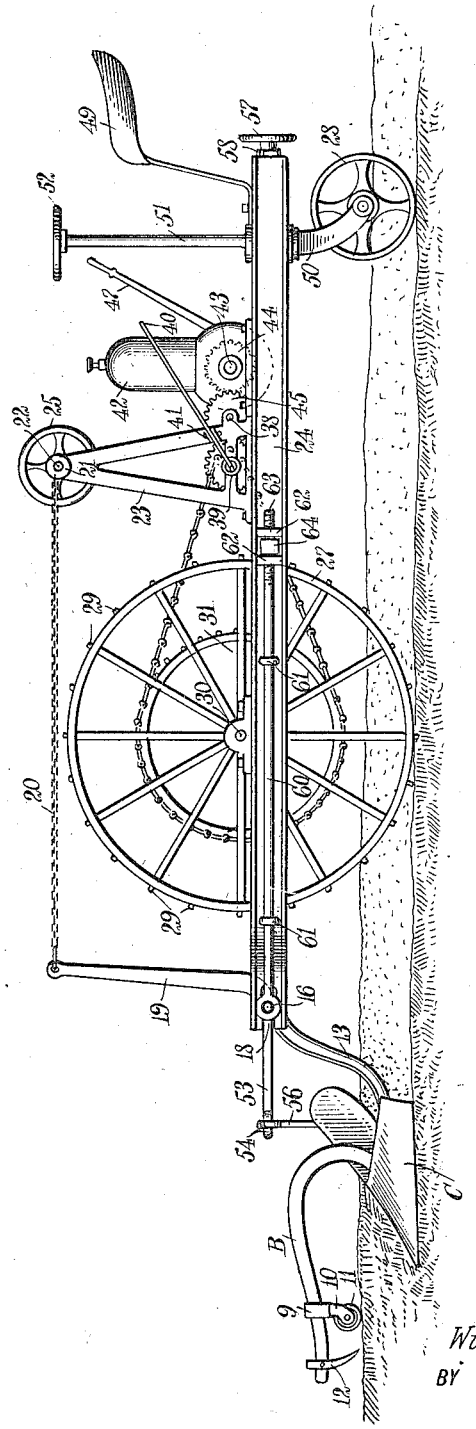

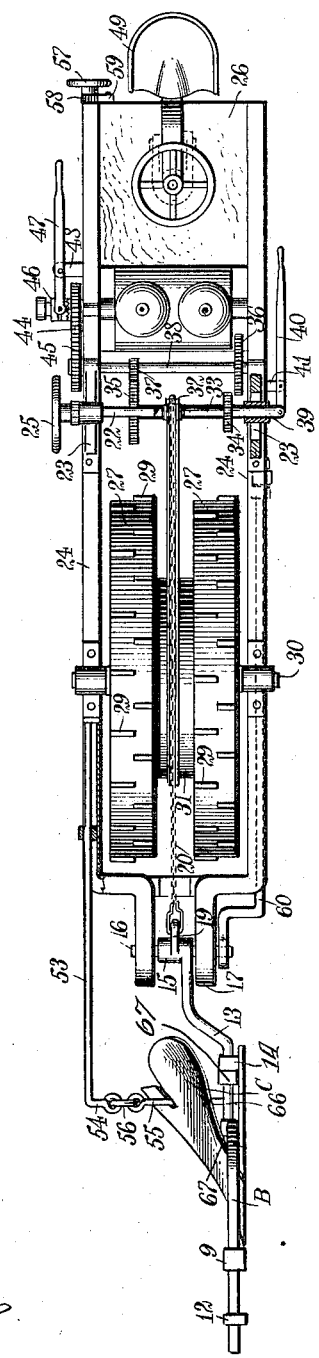

WILLIAM GORDON PARMELE, OF CHETOPA, KANSAS.

MOLDBOARD PLOWING-MACHINE.

1,029,456.

Specification of Letters Patent.

Patented June 11, 1912.

Application filed November 11, 1910. Serial No. 591,817.

*To all whom it may concern:*

Be it known that I, WILLIAM G. PARMELE, a citizen of the United States, and a resident of Chetopa, in the county of Labette and State of Kansas, have invented a new and Improved Moldboard Plowing-Machine, of which the following is a full, clear, and exact description.

Among the principal objects which the present invention has in view are: to provide a power driven traction mechanism arranged to track in the furrow formed by the plow; to provide means connected with the tractor for leveling the operation and regulating the depth of the plow; and to provide a tractor and mold board plow connected therewith constructed and arranged to normally force the plow through the earth without varying the depth of operation of the plow.

One embodiment of the present invention is disclosed in the structure illustrated in the accompanying drawings, in which like characters of reference denote corresponding parts in all the views, and in which—

Figure 1 is a side elevation of a plowing machine constructed and arranged in accordance with the present invention; Fig. 2 is a top plan view of the same; Fig. 3 is a perspective view of the plow, showing the means for mounting the same and for regulating the angle of operation of the same, and Fig. 4 is a detail view, on an enlarged scale, showing a vertical longitudinal section of a plow landside, with a fragment of the plow beam and operating boom therefor, constructed and arranged in accordance with the present invention.

In the drawings is shown a mold board plow of usual construction, having a plow beam B and a land side C. The beam B in the present plow is provided to carry a hanger 9, in bearings in the forked ends 10 of which is mounted a gage wheel 11. The gage wheel 11 is provided with a tire suitably wide to avoid becoming embedded in the earth being plowed.

Mounted on the beam B in advance of the wheel 11 is a weed knife 12. The office of the knife 12 is to separate any furze or matted undergrowth which would choke the plow by adhering to the beam B.

The plow is pivotally mounted upon a boom 13, being secured thereto by means of eyelets 14. The boom 13 is extended rearwardly from the plow, and is provided with an elongated bearing 15. The bearing 15 is rotatively mounted on a shaft 16 held between extensions 17, 17 and in slots 18, 18 formed therein. Fixedly attached to the bearing 15 and extended vertically above the same, is a lever 19. The office of the lever 19 is to lift bodily the plow A and parts connected therewith, swinging the same upward on the shaft 16. To accomplish this the lever 19 is connected to a chain 20. The chain 20 is extended rearwardly and wound upon a drum 21, which is mounted on a shaft 22 extended toward standards 23, 23. The standards 23 are bolted rigidly to side bars 24, 24 of the tractor. Fixedly mounted on the shaft 22 is a hand wheel 25 the shaft 22 and drum 21 are rotated to draw backward the lever 19 to rock the shaft 16 and lift the plow A.

The side bars 24, 24 of the tractor are structurally united by a platform 26, a suitable cross bracing arranged to make rigid the frame of the tractor. The frame of the tractor is carried on tractor wheels 27, 27 and a steering wheel 28, the latter being located at the rear of the tractor structure. The wheels 27, 27 are traction wheels, and are provided with the usual calks 29, 29. Both wheels may be rigidly connected with a shaft 30, but it is preferred by me that the wheel directly in line with the plow A shall be rigidly connected with the shaft, while the other wheel may be loosely connected therewith, this construction permitting the plow to be turned with greater ease. If, however, it is found that the grip of both wheels is required to propel the plow, both wheels may be made fast to the shaft 30. The wheels are driven through the intermediation of a sprocket wheel 31, which sprocket wheel is fixedly connected with the shaft 30. The sprocket wheel 31 is operatively connected with a small sprocket 32 fixedly mounted on a shaft 33. The shaft 33 is suitably mounted in bearings in the lower end of the standards 23, 23 and is provided with driving gears 34 and 35 fixedly connected therewith. The gears 34 and 35 are provided with different diameters, the former being the smaller of the two gears. Said gears are adapted to mesh with gears 36 and 37 respectively, the gears 34 and 37 being of equal diameter, as are also the gears 35 and 36. The shaft 33 may be shifted lengthwise thereof in its bearings to mesh alternately the gear 34 with the gear 36 and the gear 35 with the gear 37, to vary the transmission of rotary speed from the shaft 38 to the shaft 33, and through the said shaft 33 to the sprocket wheel 31 and traction wheels 27, 27. To shift the said shaft there is provided a connecting collar 39 and a lever 40 pivotally connected therewith. The lever 40 is pivotally mounted upon brackets 41, mounted on the standards 23.

The tractor is driven by any suitable motor carried thereby. In the present drawings I have shown an internal combustion engine 42 as the prime mover. The driving shaft 43 of the engine is provided with a driving gear wheel 44, which is meshed with a transmission gear 45. The transmission gear 45 is fixedly mounted on the shaft 38, and the driving gear 44 is loosely mounted on the shaft 43. To connect the shaft 43 and the driving gear 44 there is provided a clutch 46 of any suitable and approved construction. The clutch 46 is operated by a lever 47, which lever 47 is pivotally mounted in brackets 48 so arranged that the handle of the said lever is disposed in easy access to the hand of the driver when riding on the seat 49.

The tractor is operated by a driver for whom the seat 49 is provided. The seat 49 is disposed within easy access of the lever 47, whereby the clutch 46 is thrown into and out of engagement to connect the driving mechanism with the sprocket 31 to move the tractor, and the lever 40 by which the speed of progression of the tractor is varied. The machine is steered by means of the wheel 28, the fork 50 whereof is fixedly connected with a tiller post 51, at the upper end whereof is mounted a tiller wheel 52. The tiller wheel 52 is accessible to the driver while in the seat 49.

It is necessary, when using a plow of the character shown in the accompanying drawings, that the same shall be leveled and adjusted with reference to the drift thereof. To level the implement there is provided a crank rod 53, at the forward end whereof is provided a lever extension 54. The extension 54 is connected with a fixed bar 55 through the intermediary of a connecting link 56. The bar 55 is rigidly mounted on the frame of the plow at the rear of the mold board thereof. The bar 55 is extended over the plowed land and away from the land side. The crank rod 53 is pivotally mounted on that side bar 24 of the machine removed from the land side. At the opposite end of the machine, and adjacent to the driver's seat 49, is a hand wheel 57 which is fixedly mounted on the crank rod 53. Fixedly mounted on the crank rod 53 adjacent the wheel is a ratchet wheel 58. Pivotally mounted on the frame of the machine is a pawl 59. The pawl 59 engages the ratchet wheel 58 to hold the crank rod 53 in the position whereby the plow is adjusted.

To provide for the landing of the plow to avoid or provide for side drift, the shaft 16 is mounted to pivot horizontally in the side bar 24 removed from the land side, and permitted to ride free in the slot 18 formed in the side bar 24 on the land side. At this side there is connected a thrust rod 60. The thrust rod 60 is slidably mounted in eyelets 61, 61 and extended through brace plates 62, 62. The rear end of the rod 60 is provided with a screw threaded section 63 upon which is threaded a nut 64. As above stated, the boom 13 is mounted by means of the bearing 15 on the shaft 16. The boom 13 is pivotally mounted in bearing brackets 14, 14 secured to the inner side of the land side C. The horizontal extension 66 of the boom 13 is held from shifting in the brackets 65 by means of stay nuts 67, 67. The horizontal extension 66 thus constructed and arranged forms a pivot for the uptilting of the plow by the operation of the crank rod 53, and further serves to hold the share of the plow and land side C in line with the traveling path of the machine. When it is desired or found necessary to shift the plow to vary the angle of the land side with the path of travel of the machine to offset any drifting tendency either toward or away from the land, the nut 64 is manipulated to take up or pay out the rod 60 to swing the shaft 16 on its pivotal bearing to offset or inset the share or plow-point to cause the plow to avoid or take a narrow or deep furrow.

The operation of a machine constructed and arranged as shown in the accompanying drawings, and as herein described, is as follows: The machine is moved to the field of operation by its own traction. During the journey to the field the hand wheel 25 is manipulated to retract the lever 19 to lift the plow A and parts connected therewith to a position vertically above the shaft 16. The machine is driven by means of the traction wheels 27, 27 and the engine 42. The driver being seated at 49 steers the machine by means of the steering wheel 28 and the hand wheel 52 connected therewith. Having arrived at the field of operation and placed the machine in operative line, the wheel 25 is manipulated to lower the plow to permit the point thereof to enter the ground. The gage wheel 11 is advanced or receded on the beam B to gage the depth of the operation of the plow. The knife 12 is adjusted with reference to the wheel 11. In this position the machine is started, with the result that the plow being pushed by the boom 13 enters the ground to the depth permitted by the wheel 11. At this depth the plow continues to operate. The traction wheels 27, 27 following immediately in the path of the plow leave the upper surface of the ground to track in the bottom of the furrow as cut. If in the progress of cutting the furrow it be found that the plow A needs adjustment to avoid drift, or requires leveling to throw the furrow high or low, the machine is arrested in its progress, and by means of the manipulation of the nut 64 and the wheel 57, the plow A is properly adjusted to the condition under which it is working. Having arrived at the end of the furrow the machine is turned. If the plowing be the square block plowing wherein furrows are run crosswise at the end of the field, the machine is turned to follow the boundary of the field, and turned at each corner, continuing a serpentine furrow until the complete field is plowed, the plowing ending at or about the center thereof. If, however, the usual furrow is cut, disposed in parallel relation in the field, and in blocks arranged to throw the furrow in opposite directions, the plow A is raised out of the ground at the end of each furrow while the machine is driven across field and disposed in line with the next succeeding or return furrow. At all times, and with ease, the leveling of the plow or the drift of the plow may be corrected, as above stated.

Having thus described my invention, what I claim as new and desire to secure by Letters Patent is:—

1. A plowing machine comprising a furrow turning plow; a carrying frame having wheels arranged to track in the furrow formed by said plow; a boom connecting said plow with said frame, said boom being pivotally connected with said plow; and means mounted on said frame for winging said plow.

2. A plowing machine comprising a furrow forming plow; a carrying frame having wheels arranged to track in the open furrow formed by said plow; a boom pivotally mounted on said frame and extended forward therefrom, said boom being pivotally secured in longitudinally extended bearings on said plow; and a rocking lever pivotally mounted on said frame and having transmission connections with said plow to rotate the said plow on said boom.

3. A plowing machine comprising a furrow forming plow; a carrying frame having wheels arranged to track in the furrow formed by said plow; a boom having a pivot shaft for connecting with said frame, said boom being extended forward therefrom; a pivotal mounting for said shaft disposed to one side of the said boom; an adjusting mechanism for rotating said shaft on its pivot in a horizontal plane, and embodying a sliding rod having a screw threaded end section and a nut mounted thereon between fixed bearing members; and a plow connected with said boom at the forward end thereof.

4. A plowing machine comprising a furrow forming plow; a carrying frame having wheels arranged to track in the furrow formed by said plow; a boom pivotally connected with the forward end of said frame and extended in operative position below the surface of the ground; a mold board plow pivotally connected with said boom to wing thereon; and a rocking mechanism for said plow embodying a manually manipulated crank rod pivotally mounted on said frame and having links for connection with said plow.

In testimony whereof I have signed this specification in the presence of two subscribing witnesses.

WILLIAM GORDON PARMELE.

Witnesses:
BLUEFORD E. EMERT,
JOHN B. BOON.